United States Patent
Zhang et al.

(10) Patent No.: US 12,025,791 B2
(45) Date of Patent: Jul. 2, 2024

(54) LIGHT ENGINE AND ITS FINE-DISPLACEMENT ADJUSTING DEVICE

(71) Applicant: ZHEJIANG XUNSHI TECHNOLOGY CO. LTD, Shaoxing (CN)

(72) Inventors: Jing Zhang, Redondo Beach, CA (US); Jianhuan Xie, Shaoxing (CN)

(73) Assignee: ZHEJIANG XUNSHI TECHNOLOGY CO. LTD, Shaoxing (CN)

( * ) Notice: Subject to any disclaimer, the term of this patent is extended or adjusted under 35 U.S.C. 154(b) by 480 days.

(21) Appl. No.: 17/366,684

(22) Filed: Jul. 2, 2021

(65) Prior Publication Data
US 2022/0171181 A1    Jun. 2, 2022

(30) Foreign Application Priority Data
Dec. 2, 2020   (CN) .......................... 202011404730.X

(51) Int. Cl.
*G02B 7/02* (2021.01)
*G02B 26/08* (2006.01)
*H02N 2/00* (2006.01)
*H02N 2/02* (2006.01)

(52) U.S. Cl.
CPC ........... *G02B 26/0875* (2013.01); *G02B 7/02* (2013.01); *H02N 2/006* (2013.01); *H02N 2/028* (2013.01)

(58) Field of Classification Search
CPC ...... G02B 26/0875; G02B 7/02; G02B 7/023; G02B 7/00; H02N 2/006; H02N 2/028; B29C 64/20; B29C 64/264; B33Y 30/00
See application file for complete search history.

(56) References Cited

U.S. PATENT DOCUMENTS

| | | | |
|---|---|---|---|
| 11,237,465 B2* | 2/2022 | Chang | H02K 41/0356 |
| 2018/0319320 A1* | 11/2018 | Tatara | B60Q 1/507 |
| 2019/0196308 A1* | 6/2019 | Chang | G02B 7/005 |

* cited by examiner

*Primary Examiner* — Mustak Choudhury
(74) *Attorney, Agent, or Firm* — Xuan Zhang

(57) ABSTRACT

A fine-displacement adjusting device is constructed to have a first base portion and a second base portion spacedly encircled therewithin. The fine-displacement adjusting device further includes a first retractable element biased between the first and second base portions, and a first resilient element biased between the first and second base portions. The first retractable element is configured to extend and retract its length along a first axis to move the second base portion in a reciprocating manner. When the second base portion is moved by the first retractable element, the first resilient element moves the second base portion along the first axis to restore the second base portion. Therefore, the second base portion is fine-moved along the first axis in a reciprocating manner for adjusting the fine-displacement of an optical lens relative to an optical light source of a light engine in the first axis.

24 Claims, 6 Drawing Sheets

LIGHT ENGINE AND ITS FINE-DISPLACEMENT ADJUSTING DEVICE

CROSS REFERENCE OF RELATED APPLICATION

This is a non-provisional application that claims priority under 35 U.S.C. 119(a-d) to Chinese application number CN 202011404730.X, filed Dec. 2, 2020. The afore-mentioned patent application is hereby incorporated by reference in its entirety.

BACKGROUND

1. Field of the Invention

The present invention primarily relates to the field of mechanical precision displacement driver. More particularly, the present invention relates to a light engine and its fine-displacement adjusting device.

2. Discussion of the Related Art

The basic principle of DLP (Digital Light Procession) 3D printing technology is that a digital light source is configured to project light on a surface of liquid photosensitive resin to solidify the photosensitive resin for creating a 3D object through layer-by-layer printing. Comparing with other 3D printing technologies, DLP has a major advantage of manufacturing fine portions of the 3D object, such as jewelry or dental molds. How to improve printing accuracy and how to enhance the surface treatment quality is one of the popular searches in the 3D printing industry.

For example, when the DLP equipment incorporates with a light engine with a model number 1K95 (1920×1080) to print a 3D object, the pixels are too large and the connections of the printing surfaces are inconsistent. After the object is made, the surface of the object is rough, so that the surface of the object must be sanded and polished before it can be used. One of the methods to solve the above mentioned problem is to adjust a relative fine-displacement between the lens and the light source of the light engine.

Regarding the fine-displacement adjustment, the existing solutions in the industry are mainly focused on how to improve the mechanical components of the machine. However, the structural configuration of the machine will be complicated and will require more components, and the cost of the machine will be relatively high.

Therefore, people who skilled in the art aim to develop a fine-displacement adjustment suitable for the lens of the light engine suitable for the field of 3D printing industry.

BRIEF SUMMARY OF THE INVENTION

Currently, there is no solution targeting the DLP 3D printing machine to solve the problems of surface rippling and low surface finishing. Without altering the structural configuration of the light engine, how to properly improve the surface finishing of the 1K light engine is still an existing unsolved problem. Accordingly, one of the major technical factors to solve the above problem is to achieve a two dimensional fine-displacement between the optical lens and the optical light source. After long-term observation and experimentation, the inventor of the present invention found that the fine-displacement of the optical lens in the two-dimensional direction can effectively improve the surface finishing of the 3D printing.

In view of the above-mentioned shortcomings of the prior art, the present invention is able to solve the technical problem of how to achieve the fine-displacement of the optical lens at low cost so as to improve the printing accuracy and the smoothness of the surface printing.

In order to achieve the above objective, the present invention provides a fine-displacement adjusting device, which comprises a first base portion, a second base portion, a first retractable element, and a restoring element.

The second base portion is configured to have a frame structure, wherein the second base portion is encircled within the first base portion, wherein the first base portion and the second base portion are symmetrically formed with respect to the first axis.

The first retractable element is disposed between the first base portion and the second base portion, and is configured to stretch and retract its length along the direction of the first axis so as to move the second base portion along the direction of the first axis in a reciprocating manner. In other words, the second base portion is able to moved back and forth by the first retractable element within the first base portion.

The restoring element is disposed between the first base portion and the second base portion and is located opposite to the first retractable element, wherein the restoring element is arranged in such a manner that when the second base portion is moved by a pushing force the first retractable element, the restoring element is arranged to apply a restoring force to the second base portion opposite to the pushing force of the first retractable element so as to restore the second base portion back to its original position.

The restoring element is further arranged in such a manner that when the first retractable element is extended its length, the length of the restoring element is correspondingly shortened, and when the first retractable element is retracted its length, the length of the restoring element is correspondingly prolonged.

Accordingly, the restoring element is a resilient element.

A first retractable element receiving cavity is formed at the first base portion to receive the first retractable element, and a first elastic element receiving cavity is formed at the first base portion to receive the first elastic element, wherein the first resilient receiving cavity and the first retractable element receiving cavity are located opposite to each other and are symmetrically formed with respect to the first axis.

Accordingly, the second axis and the first axis are perpendicular to each other.

A first slit is formed at a space between the first base portion and the second base portion, and is symmetrically formed with respect to the first axis, wherein two first sheet-like substrate portions are provided, wherein one of the first sheet-like substrate portion is formed between the first resilient element receiving cavity and the first slit, and one of the first sheet-like substrate portion is formed between the first slit and the first retractable element receiving cavity, wherein the first sheet-like substrate portions are symmetrically formed with respect to the first axis.

The first retractable element is disposed in the first retractable element receiving cavity.

The first resilient element is disposed in the first resilient element receiving cavity and is configured to apply an resilient force along the direction of the first axis.

Furthermore, the first resilient element is a compression spring.

Furthermore, the first retractable element comprises a piezoelectric ceramic configured to extend or retract its length in response to a voltage applied thereto.

Furthermore, the first base portion and the second base portion are made of elastic alloy.

Furthermore, the elastic alloy is spring steel 65Mn.

Furthermore, the sheet-like substrate portion is formed at one time by slow-feeding linear cutting process.

Furthermore, the first retractable element comprises a rod-shaped magnetostrictive member, wherein the length of the magnetostrictive member is extended and retracted in response to an alternating magnetic field signal.

The fine-displacement adjusting device further comprises a third base portion and a second retractable element.

The third base portion is configured to have a frame structure, wherein the third base portion is encircled within the second base portion, wherein the second base portion and the third base portion are symmetrically formed with respect to the second axis.

A second retractable element receiving cavity is formed at the second base portion to receive the second retractable element, and a second elastic element receiving cavity is formed at the second base portion to receive the second elastic element, wherein the second resilient receiving cavity and the second retractable element receiving cavity are located opposite to each other and are symmetrically formed with respect to the second axis.

A second slit is formed at a space between the second base portion and the third base portion, and is symmetrically formed with respect to the second axis, wherein two second sheet-like substrate portions are provided, wherein one of the second sheet-like substrate portion is formed between the second resilient element receiving cavity and the second slit, and one of the second sheet-like substrate portion is formed between the second slit and the second retractable element receiving cavity, wherein the second sheet-like substrate portions are symmetrically formed with respect to the second axis.

The second retractable element is disposed in the second retractable element receiving cavity and is configured to extend and retract its length along the direction of the second axis so as to move the third base portion in a reciprocating manner relative to the second base portion.

The second resilient element is received in the second resilient element receiving cavity to bias against the third base portion for applying a resilient force thereat so as to restore the third base portion back to its position relative to the second base portion.

Furthermore, the second resilient element is received in the second resilient element receiving cavity to apply a resilient force in the direction of the second axis.

Furthermore, the second resilient element is a compression spring.

Furthermore, the first retractable element comprises a piezoelectric ceramics is configured to extend or retract its length in response to a voltage applied thereto.

Furthermore, the first base portion and the second base portion are made of elastic alloy.

Furthermore, the elastic alloy is spring steel 65Mn.

Furthermore, the sheet-like substrate portion is formed at one time by slow-feeding linear cutting process.

Furthermore, the first retractable element comprises a rod-shaped magnetostrictive member, wherein the length of the magnetostrictive member is extended and retracted in response to an alternating magnetic field signal.

In accordance with another aspect of the invention, the present invention provides a light engine which comprises a fine-displacement adjusting device, a lens retainer, a light engine retainer, an optical lens and an optical light source.

The fine-displacement adjusting device comprises a first base portion, a second base portion, a third base portion, a first retractable element, a second retractable element, a first resilient element and a second resilient element.

The second base portion is configured to have a frame structure, wherein the second base portion is encircled within the first base portion, wherein the first base portion and the second base portion are symmetrically formed with respect to the first axis. The third base portion is configured to have a frame structure, wherein the third base portion is encircled within the second base portion, wherein the second base portion and the third base portion are symmetrically formed with respect to the second axis.

Accordingly, the second axis and the first axis are perpendicular to each other.

The first retractable element is disposed between the first base portion and the second base portion, and is configured to extend and retract its length along the direction of the first axis so as to move the second base portion along the direction of the first axis in a reciprocating manner relative to the first base portion.

The second retractable element is disposed between the second base portion and the third base portion, and is configured to extend and retract its length along the direction of the second axis so as to move the third base portion along the direction of the second axis in a reciprocating manner relative to the second base portion.

The first resilient element is disposed opposite to the first stretchable element and is located between the first base portion and the second base portion, wherein the first resilient element is arranged in such a manner that when the second base portion is moved by a pushing force the first retractable element, the first resilient element is arranged to apply a first restoring force to the second base portion opposite to the pushing force of the first retractable element so as to restore the second base portion back to its original position.

The second resilient element is disposed opposite to the second stretchable element and is located between the second base portion and the third base portion, wherein the second resilient element is arranged in such a manner that when the third base portion is moved by a pushing force the second retractable element, the second resilient element is arranged to apply a second restoring force to the third base portion opposite to the pushing force of the second retractable element so as to restore the third base portion back to its original position.

An opening is formed at a center of the third base portion to operatively connected to the optical lens, so that the optical lens is controllably driven to move accordingly.

The fine-displacement adjusting device is connected to an optical lens through a lens retainer, and is configured to drive the optical lens to move correspondingly.

The optical lens is operatively connected to the optical light source through the light engine retainer.

Furthermore, the first resilient element receiving cavity and the first retractable element receiving cavity are formed at two opposite inner sides of the first base portion with respect to the second axis, and are symmetrically formed along the first axis.

The second resilient element receiving cavity and the second retractable element receiving cavity are formed at two opposite inner sides of the second base portion with respect to the first axis, and are symmetrically formed along the second axis.

A first slit is formed at a space between the first base portion and the second base portion, and is symmetrically formed with respect to the first axis, wherein two first sheet-like substrate portions are provided, wherein one of the first sheet-like substrate portion is formed between the first resilient element receiving cavity and the first slit, and one of the first sheet-like substrate portion is formed between the first slit and the first retractable element receiving cavity, wherein the first sheet-like substrate portions are symmetrically formed with respect to the first axis.

A second slit is formed at a space between the second base portion and the third base portion, and is symmetrically formed with respect to the second axis, wherein two second sheet-like substrate portions are provided, wherein one of the second sheet-like substrate portion is formed between the second resilient element receiving cavity and the second slit, and one of the second sheet-like substrate portion is formed between the second slit and the second retractable element receiving cavity, wherein the second sheet-like substrate portions are symmetrically formed with respect to the second axis.

The first retractable element is disposed in the first retractable element receiving cavity and is configured to extend and retract its length along the direction of the first axis so as to move the second base portion in a reciprocating manner relative to the first base portion.

The second retractable element is disposed in the second retractable element receiving cavity and is configured to extend and retract its length along the direction of the second axis so as to move the third base portion in a reciprocating manner relative to the second base portion.

The first resilient element is received in the first resilient element receiving cavity to bias against the second base portion for applying a resilient force thereat so as to restore the second base portion back to its position relative to the second base portion.

The second resilient element is received in the second resilient element receiving cavity to bias against the third base portion for applying a resilient force thereat so as to restore the third base portion back to its position relative to the second base portion.

Furthermore, the first retractable element comprises a piezoelectric ceramic and the second retractable element comprises a piezoelectric ceramic, wherein each of the piezoelectric ceramics is configured to extend or retract its length in response to a voltage applied thereto, wherein the first resilient element and the second resilient element are two compression springs.

The positioning member, having a bead head, is mounted at the light engine retainer, wherein the protrusion platform is formed at a bottom side of the light engine retainer, wherein a height of the protrusion platform is greater than a thickness of the disc-shaped connecting member between the bottom of the optical lens and the optical light source to define a gap between the bottom of the optical lens and the optical light source, wherein a height of the gap is smaller than the height of the positioning member, so that the positioning member is interference fitted, wherein an elasticity of the bead head of the positioning member is configured to press against the optical lens being tightly fixed on the optical light source.

Furthermore, the first base portion, the second base portion and the third base portion are made of elastic alloy.

Furthermore, the elastic alloy is spring steel 65Mn.

Furthermore, each of the first sheet-like substrate portion and the second sheet-like substrate portion is formed at one time by slow-feeding linear cutting process.

Furthermore, each of the first retractable element and the second retractable element comprises a rod-shaped magnetostrictive member, wherein the length of the magnetostrictive member is extended and retracted in response to an alternating magnetic field signal.

Comparing with the existing technical solutions, the present invention provides a fine-displacement adjusting device having the advantages of simple structural configuration, low cost, easy installation, achieving nano-scale fine-displacement adjustment, and capable of selectively fine-moving the optical lens or the optical light source in two dimensional directions. By controllably adjusting a relative displacement between the optical lens and the optical light source, the printing accuracy of the light engine can be highly improved.

For a more complete understanding of the present invention with its objectives and distinctive features and advantages, reference is now made to the following specification and to the accompanying drawings.

BRIEF DESCRIPTION OF THE DRAWING(S)

wherein 1—first base portion, 2—second base portion, 3—third base portion, 41—first sheet-like substrate portion, 42—second sheet-like substrate portion, 151—first resilient element receiving cavity, 161—first retractable element receiving cavity, 252—second resilient element receiving cavity, 262—second retractable element receiving cavity, 12—first slit, 23—second slit, 51—first resilient element, 61—first retractable element, 52—second resilient element, 62—second retractable element, 8—first axis, 9—second axis, 100—fine-displacement adjusting device, 101—lens retainer, 102—light engine retainer, 103—positioning member, 104—connecting member, 105—connecting screw, 106—micro gap, 1021—protrusion platform, 108—optical lens, 109—optical light source.

DETAILED DESCRIPTION OF THE INVENTION

In the following description, for purpose of explanation, numerous specific details are set forth in order to provide a thorough understanding of some example embodiments. It will be evident, however, to one of ordinary skill in the art that embodiments of the present invention may be practiced without these specific details.

It is also to be understood that the specific devices and processes illustrated in the attached drawings, elements with the same structure are denoted by the same reference number and elements with similar structures or functions are denoted by similar reference numbers. Hence, specific dimensions, such as size and thickness, and other physical characteristics relating to the embodiments disclosed herein are not to be considered as limiting, unless the claims expressly state otherwise.

Figure 1:
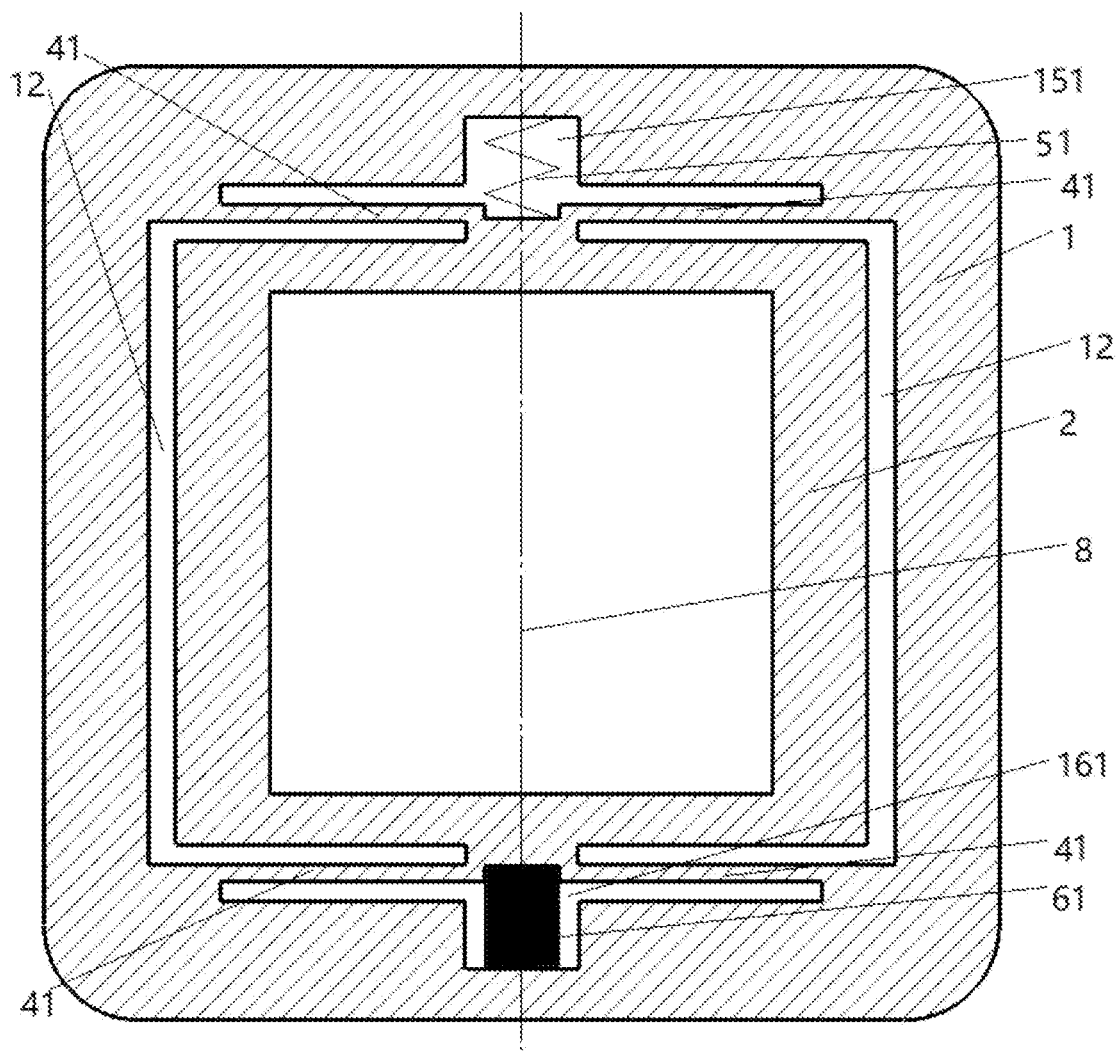
FIG. 1 is a sectional view of a fine-displacement adjusting device according to a first embodiment of the present invention.
Figure 2:
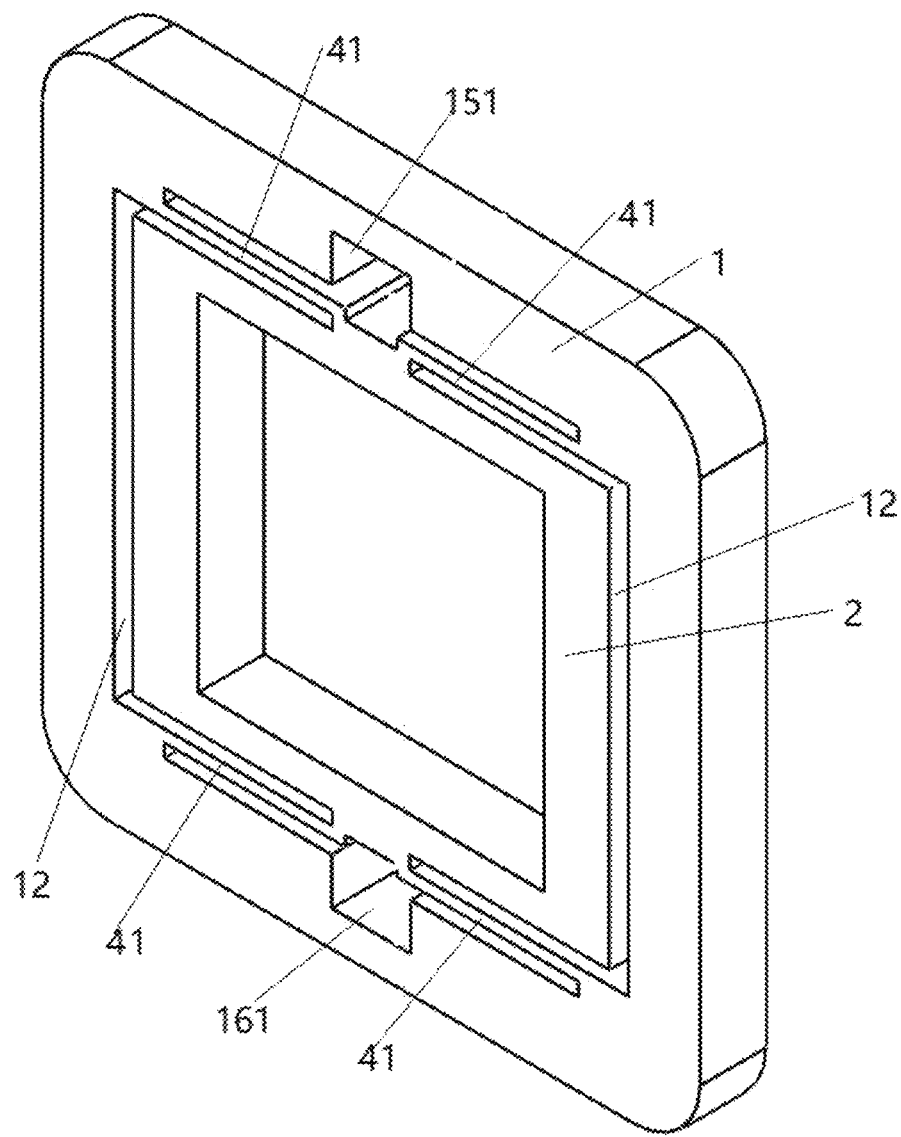
FIG. 2 is a perspective view of the fine-displacement adjusting device according to the first embodiment of the present invention.

As shown in FIGS. 1 and 2 of the drawings, a fine-displacement adjusting device according to a first embodiment of the present invention is illustrated, wherein the fine-displacement adjusting device comprises a first base portion 1, a second base portion 2, a first resilient element 51, and a first retractable element 61. The second base portion 2 is spacedly encircled within the first base portion 1, wherein the first base portion 1 and the second base portion 2 are configured as a hollow outer portion and a hollow inner portion respectively, and are symmetrically formed with respect to a first axis 8. The fine-displacement adjusting device further has a first slit 12 defined at a space between the first base portion 1 and the second base portion 2, and symmetrically formed with respect to the first axis 8. The fine-displacement adjusting device further has a first resilient receiving cavity 151 and a first retractable element receiving cavity 161 indented on and formed at two inner sides of the first base portion 1 respectively, and are symmetrically formed with respect to the first axis 8. In other words, the first resilient receiving cavity 151 and the first retractable element receiving cavity 161 are formed along the first axis 8 and openings of the first resilient receiving cavity 151 and the first retractable element receiving cavity 161 are aligned with and faced toward each other. Accordingly, the second axis 9 and the first axis 8 are perpendicular to each other.

The fine-displacement adjusting device further has two first sheet-like substrate portions 41, wherein one of the first sheet-like substrate portion 41 is formed between the first resilient element receiving cavity 151 and the first slit 12, and one of the first sheet-like substrate portion 41 is formed between the first slit 12 and the first retractable element receiving cavity 161. Each of the first sheet-like substrate portions 41 is integrated between the first base portion 1 and the second base portion 2, wherein the first sheet-like substrate portions 41 are symmetrically formed with respect to the first axis 8.

According to the preferred embodiment, the first resilient element 51 is a compression spring, wherein the first resilient element 51, having two ends, is coaxially aligned with the first axis 8. The first retractable element 61 is a piezoelectric ceramic, wherein the first retractable element 61, having two ends, is aligned with the first axis 8, so that the first retractable element 61 is retractable along the first axis 8. The first resilient element 51 is arranged to drive the second base portion 2 to move along the first axis 8 in a reciprocating manner relative to the first base portion 1. In other words, the second base portion 2 is driven to move within the first base portion 1 along the first axis 8 in a reciprocating manner.

The material of the fine-displacement adjusting device is made of spring steel 65Mn, which is manufactured by slow-feeding linear cutting process to ensure extremely high precision so as to ensure a uniform thickness of the sheet-like substrate portion. When the second base portion 2 is moved, the moving direction thereof is guaranteed to move in a straight line along the first axis 8, so as to prevent any deflection due to an uneven thickness of the sheet-like substrate portion.

The fine-displacement adjusting device is driven by the piezoelectric ceramic of the first retractable element 61, wherein by utilizing positive piezoelectric effect of the piezoelectric ceramic, i.e. when the piezoelectric ceramic is electrified, the piezoelectric ceramic is stretched to extend its length. The unit of the displacement of the piezoelectric ceramic is nanometer. The specification parameters of the compression spring and the force and displacement of the piezoelectric ceramics are correspondingly configured.

According to the preferred embodiment, the first retractable element 61 is the piezoelectric ceramic, wherein when a current is applied thereto, the piezoelectric ceramic is stretched to prolong its length in a predetermined displacement due to the positive piezoelectric effect. The displacement of the piezoelectric ceramic is direct proportional to a voltage applied to the piezoelectric ceramic. Since the fine-displacement adjusting device is made of spring steel, the first sheet-like substrate portion 41 has good flexibility and is easy for being pushed. When the piezoelectric ceramic is electrified to prolong its length, i.e. the extended length, the piezoelectric ceramic will apply a pushing force to the first sheet-like substrate portion 41, in order to push the second base portion 2 to move along the direction of the first axis 8 so as to compress the first resilient member 51 located at an opposite of the piezoelectric ceramic. In other words, the first resilient member 51 is biased between an inner wall of the first resilient member receiving cavity 151 and the first sheet-like substrate portion 41 at one side of the second base portion 2 while the first retractable member 61 is biased between an inner wall of the first retractable member receiving cavity 161 and the first sheet-like substrate portion 41 at an opposed side of the second base portion 2. According to the preferred embodiment, the first resilient member 51 is a compression spring, wherein the first resilient member 51 is compressed when the first retractable member 61 is extended its length. Through this working configuration, the second base portion 2 is pushed at the middle thereof to produce a fine-displacement. When the power is cut off, the piezoelectric ceramic is retracted to its original length, the pushing force of the piezoelectric ceramic disappears that the pushing force at the second base portion 2 is release, such that the compressed compression spring is rebounded to its original form and the second base portion 2 is moved back to its original position. By controlling the electrified voltage and the magnitude of the current, the fine-displacement of the second base portion 2 can be accurately controlled to achieve the fine-displacement adjustment in a direction of the first axis 8 and to obtain the fine-displacement in one dimension.

Figure 3:
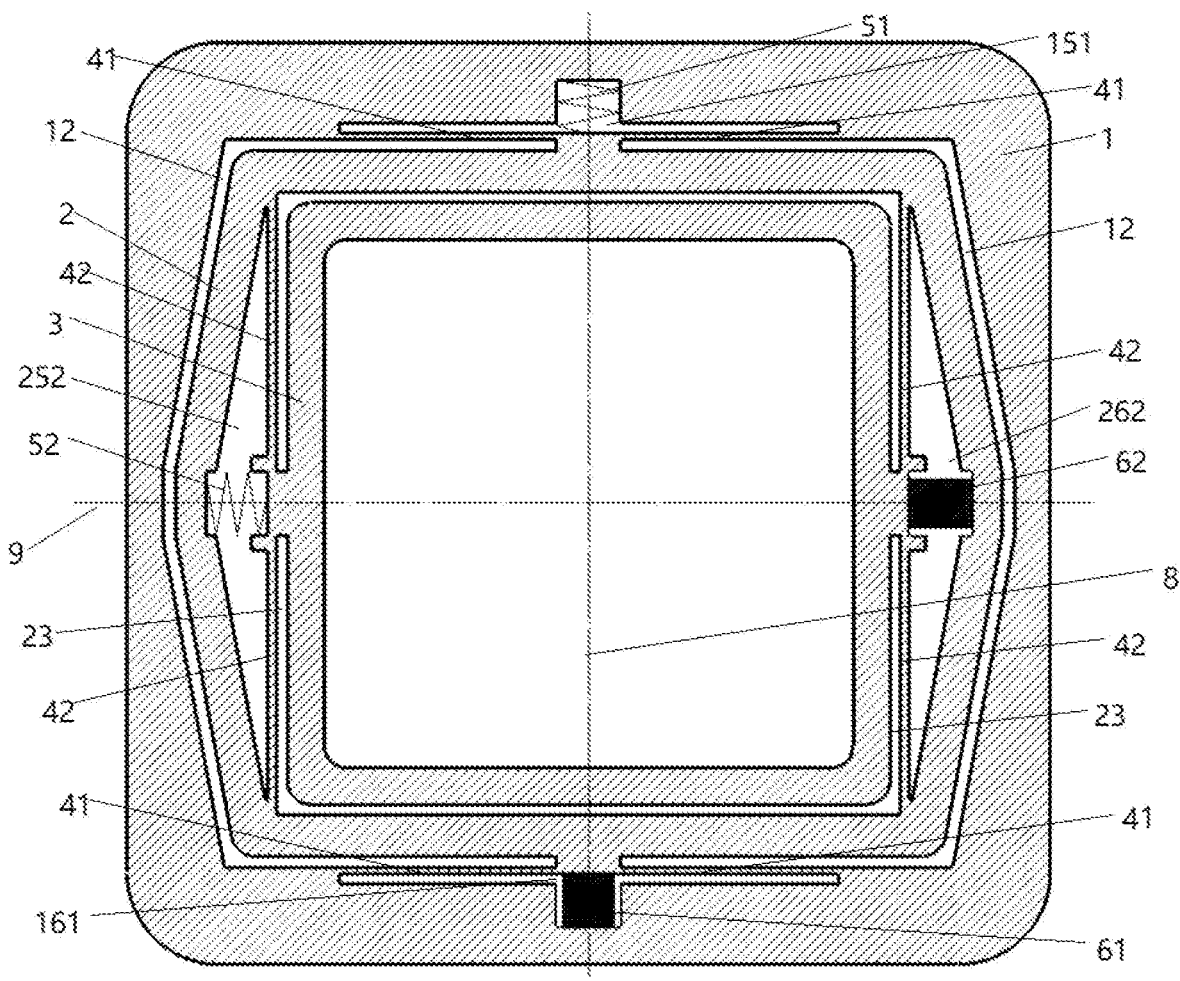
FIG. 3 is a sectional view of a fine-displacement adjusting device according to a second embodiment of the present invention.

As shown in FIG. 3, a fine-displacement adjusting device according to a second embodiment of the present invention is illustrated, wherein the fine-displacement adjusting device comprises a first base portion 1, a second base portion 2, a third base portion 3, a first resilient element 51, a first retractable element 61, a second resilient element 52 and a second retractable element 62.

The second base portion 2 is spacedly encircled within the first base portion 1, wherein the first base portion 1 and the second base portion 2 are symmetrically formed with respect to a first axis 8. The third base portion 3 is spacedly encircled within the second base portion 2, wherein the second base portion 2 and the third base portion 2 are symmetrically formed with respect to a second axis 9. In other words, the first base portion 1, the second base portion 2, and the third base portion 3 are configured as a hollow outer portion, a hollow mid-portion and a hollow inner portion respectively.

Accordingly, the second axis 9 and the first axis 8 are perpendicular to each other.

The fine-displacement adjusting device further has a first slit 12 defined at a space between the first base portion 1 and the second base portion 2, and symmetrically formed with respect to the first axis 8. The fine-displacement adjusting device further has a first resilient receiving cavity 151 and a first retractable element receiving cavity 161 indented in and formed at two inner sides of the first base portion 1 respectively, and are symmetrically formed with respect to the first axis 8. In other words, the first resilient receiving cavity 151 and the first retractable element receiving cavity 161 are formed along the first axis 8 and openings of the first resilient receiving cavity 151 and the first retractable element receiving cavity 161 are aligned with and faced toward each other. The fine-displacement adjusting device further has a second slit 23 defined at a space between the second base portion 2 and the third base portion 3, and symmetrically formed with respect to the second axis 9. The fine-displacement adjusting device further has a second resilient receiving cavity 252 and a second retractable element receiving cavity 262 indented in and formed at two inner sides of the second base portion 2 respectively, and are symmetrically formed with respect to a second axis 9. In other words, the second resilient receiving cavity 252 and the second retractable element receiving cavity 262 are formed along the second axis 9 and openings of the second resilient receiving cavity 252 and the second retractable element receiving cavity 262 are aligned with and faced toward each other.

The fine-displacement adjusting device further has two first sheet-like substrate portion 41, wherein one of the first sheet-like substrate portion 41 is formed between the first resilient element receiving cavity 151 and the first slit 12, and one of the first sheet-like substrate portion 41 is formed between the first slit 12 and the first retractable element receiving cavity 161. Each of the first sheet-like substrate portions 41 is integrated between the first base portion 1 and the second base portion 2, wherein the first sheet-like substrate portions 41 are symmetrically formed with respect to the first axis 8. The fine-displacement adjusting device further has two second sheet-like substrate portion 42, wherein one of the second sheet-like substrate portion 42 is formed between the second resilient element receiving cavity 252 and the second slit 23, and one of the second sheet-like substrate portion 42 is formed between the second slit 23 and the second retractable element receiving cavity 262. Each of the second sheet-like substrate portions 42 is integrated between the second base portion 2 and the third base portion 3, wherein the second sheet-like substrate portions 42 are symmetrically formed with respect to the second axis 9.

According to the preferred embodiment, the first resilient element 51 is a compression spring, wherein the first resilient element 51, having two ends, is coaxially aligned with the first axis 8. The first retractable element 61 is a piezoelectric ceramic, wherein the first retractable element 61, having two ends, is aligned with the first axis 8, so that the first retractable element 61 is retractable along the first axis 8. The first resilient element 51 is arranged to drive the second base portion 2 to move along the first axis 8 in a reciprocating manner relative to the first base portion 1. In other words, the second base portion 2 is driven to move within the first base portion 1 along the first axis 8 in a reciprocating manner.

The second resilient element 52 is a compression spring, wherein second first resilient element 52, having two ends, is coaxially aligned with the second axis 9. The second retractable element 62 is a piezoelectric ceramic, wherein second first retractable element 62, having two ends, is aligned with the second axis 9, so that the second retractable element 62 is retractable along the second axis 9. The second resilient element 52 is arranged to drive the third base portion 3 to move along the second axis 9 in a reciprocating manner relative to the second base portion 2. In other words, the third base portion 3 is driven to move within the second base portion 2 along the second axis 9 in a reciprocating manner.

The material of the fine-displacement adjusting device is made of spring steel 65Mn, which is manufactured by slow-feeding linear cutting process to ensure extremely high precision so as to ensure a uniform thickness of each of the sheet-like substrate portions. When the second base portion 2 and the third base portion 3 are individually moved, the moving directions thereof are guaranteed to move in a straight line along the first axis 8 and second axis 9, so as to prevent any deflection due to an uneven thickness of each of the sheet-like substrate portions.

The fine-displacement adjusting device is driven by the piezoelectric ceramics of the first retractable element 61 and the second retractable element 62, wherein by utilizing positive piezoelectric effect of each of the piezoelectric ceramics, i.e. when the piezoelectric ceramic is electrified, the piezoelectric ceramic is stretched to extend its length. The unit of the displacement of the piezoelectric ceramic is nanometer. The specification parameters of the compression spring and the force and displacement of the piezoelectric ceramics are correspondingly configured.

According to the preferred embodiment, the first retractable element 61 is the piezoelectric ceramic, wherein when a current is applied thereto, the piezoelectric ceramic is stretched to prolong its length in a predetermined displacement due to the positive piezoelectric effect. The displacement of the piezoelectric ceramic is direct proportional to a voltage applied to the piezoelectric ceramic. Since the fine-displacement adjusting device is made of spring steel, the first sheet-like substrate portion 41 has good flexibility and is easy for being pushed. When the piezoelectric ceramic is electrified to prolong its length, i.e. the extended length, the piezoelectric ceramic will apply a pushing force to the first sheet-like substrate portion 41, in order to push the second base portion 2 to move along the direction of the first axis 8 so as to compress the first resilient member 51 located at an opposite of the piezoelectric ceramic. In other words, the first resilient member 51 is biased between an inner wall of the first resilient member receiving cavity 151 and the first sheet-like substrate portion 41 at one side of the second base portion 2 while the first retractable member 61 is biased between an inner wall of the first retractable member receiving cavity 161 and the first sheet-like substrate portion 41 at an opposed side of the second base portion 2. According to the preferred embodiment, the first resilient member 51 is a compression spring, wherein the first resilient member 51 is compressed when the first retractable member 61 is extended its length. Through this working configuration, the second base portion 2 is pushed at the middle thereof to produce a fine-displacement. When the power is cut off, the piezoelectric ceramic is retracted to its original length, the pushing force of the piezoelectric ceramic disappears that the pushing force at the second base portion 2 is release, such that the compressed compression spring is rebounded to its original form and the second base portion 2 is moved back to its original position. By controlling the electrified voltage and the magnitude of the current, the fine-displacement of the second base portion 2 can be accurately controlled to achieve the fine-displacement adjustment in a direction of the first axis 8 and to obtain the fine-displacement in one dimension.

According to the preferred embodiment, the second retractable element 62 is the piezoelectric ceramic, wherein when a current is applied thereto, the piezoelectric ceramic is stretched to prolong its length in a predetermined displacement due to the positive piezoelectric effect. The displacement of the piezoelectric ceramic is direct proportional to a voltage applied to the piezoelectric ceramic. Since the fine-displacement adjusting device is made of spring steel, the second sheet-like substrate portion 42 has good flexibility and is easy for being pushed. When the piezoelectric ceramic is electrified to prolong its length, i.e. the extended length, the piezoelectric ceramic will apply a pushing force to the second sheet-like substrate portion 42, in order to push the third base portion 3 to move along the direction of the second axis 9 so as to compress the second resilient member 52 located at an opposite of the piezoelectric ceramic. In other words, the second resilient member 52 is biased between an inner wall of the second resilient member receiving cavity 252 and the second sheet-like substrate portion 42 at one side of the third base portion 3 while the second retractable member 62 is biased between an inner wall of the second retractable member receiving cavity 262 and the second sheet-like substrate portion 42 at an opposed side of the third base portion 3. According to the preferred embodiment, the second resilient member 52 is a compression spring, wherein second first resilient member 52 is compressed when the second retractable member 62 is extended its length. Through this working configuration, the third base portion 3 is pushed at the middle thereof to produce a fine-displacement. When the power is cut off, the piezoelectric ceramic is retracted to its original length, the pushing force of the piezoelectric ceramic disappears that the pushing force at the third base portion 3 is release, such that the compressed compression spring is rebounded to its original form and the third base portion 3 is moved back to its original position. By controlling the electrified voltage and the magnitude of the current, the fine-displacement of the third base portion 3 can be accurately controlled to achieve the fine-displacement adjustment in a direction of the second axis 9 and to obtain the fine-displacement in one dimension.

By individually and selectively electrifying the first retractable element 61 and the second retractable element 62 of the fine-displacement adjusting device, the entre second base portion 2 can be pushed to move along the first axis 8 and/or the entre third base portion 3 can be pushed to move along the second axis 9. The displacement directions are perpendicular to each other, as an example of horizontal and vertical directions in two dimensional fine-displacement adjustments.

According to the preferred embodiment, the first resilient element receiving cavity 151 and the first retractable receiving cavity 161 are uniform and identical, and are symmetrical to the first axis 8 to ensure the directions of the pushing forces applied by the first retractable element 61 and the first resilient element 51 always along the direction of the first axis 8, so as to maintain the second base portion 2 being moved steadily along the first axis 8. Therefore, the displacement of the second base portion will be ensured without any deflection due to an uneven thickness of each of the sheet-like substrate portions. Similarly, the second resilient element receiving cavity 252 and the second retractable receiving cavity 262 are uniform and identical, and are symmetrical to the second axis 9 to ensure the directions of the pushing forces applied by the second retractable element 62 and the second resilient element 52 always along the direction of the second axis 9, so as to maintain the third base portion 3 being moved steadily along the second axis 9. Therefore, the displacement of the third base portion will be ensured without any deflection due to an uneven thickness of each of the sheet-like substrate portions.

According to the preferred embodiment, the fine-displacement adjusting device is able to achieve the adjustment of the fine-displacement in two mutually perpendicular directions in two dimensional manner. Therefore, the fine-displacement adjusting device is able to incorporate with the field of laser tuning, focusing, optical instrument lens fine-tuning, precision machine tool adjustment, fine-motion platform adjustment or other similar fields.

Alternatively, the first retractable element 61 and the second retractable element 62 are two rod-shaped magnetostrictive members respectively, wherein the length of the magnetostrictive member is changed in response to the magnetic field, so as to generate a fine-displacement. Therefore, when selectively applying the magnetic field to the first retractable element 61 and the second retractable element 62, similar to the piezoelectric ceramics, the entire second base portion 2 is moved along the first axis 8 and/or the entire third base portion 3 is moved along the second axis 9 so as to compress the corresponding compression springs. These two displacement directions are perpendicular to each other, as an example of horizontal and vertical directions in two dimensional fine-displacement adjustments.

Figure 4:
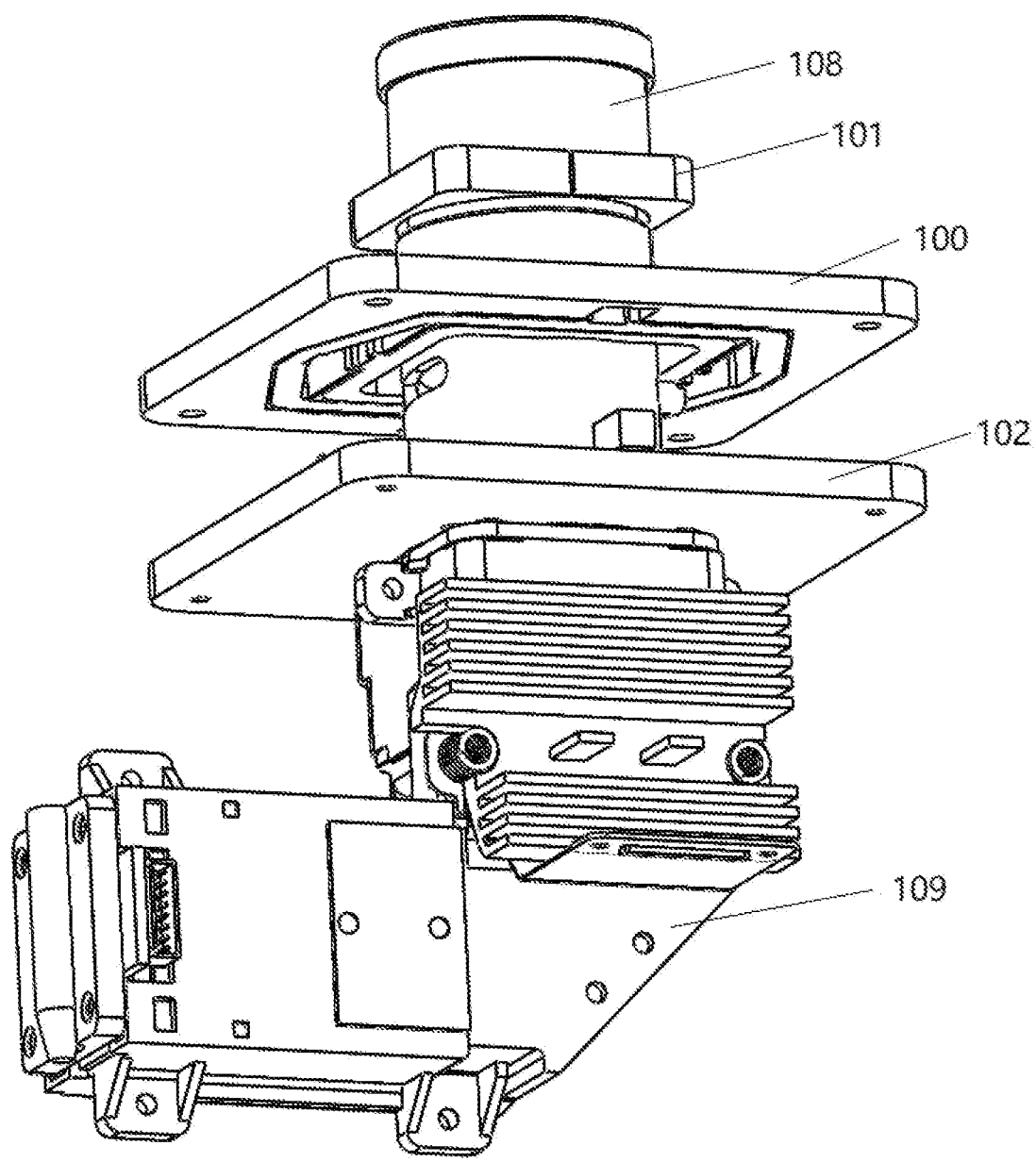
FIG. 4 is a perspective view of the fine-displacement adjusting device assembling to a light engine according to the embodiment of the present invention.
Figure 5:
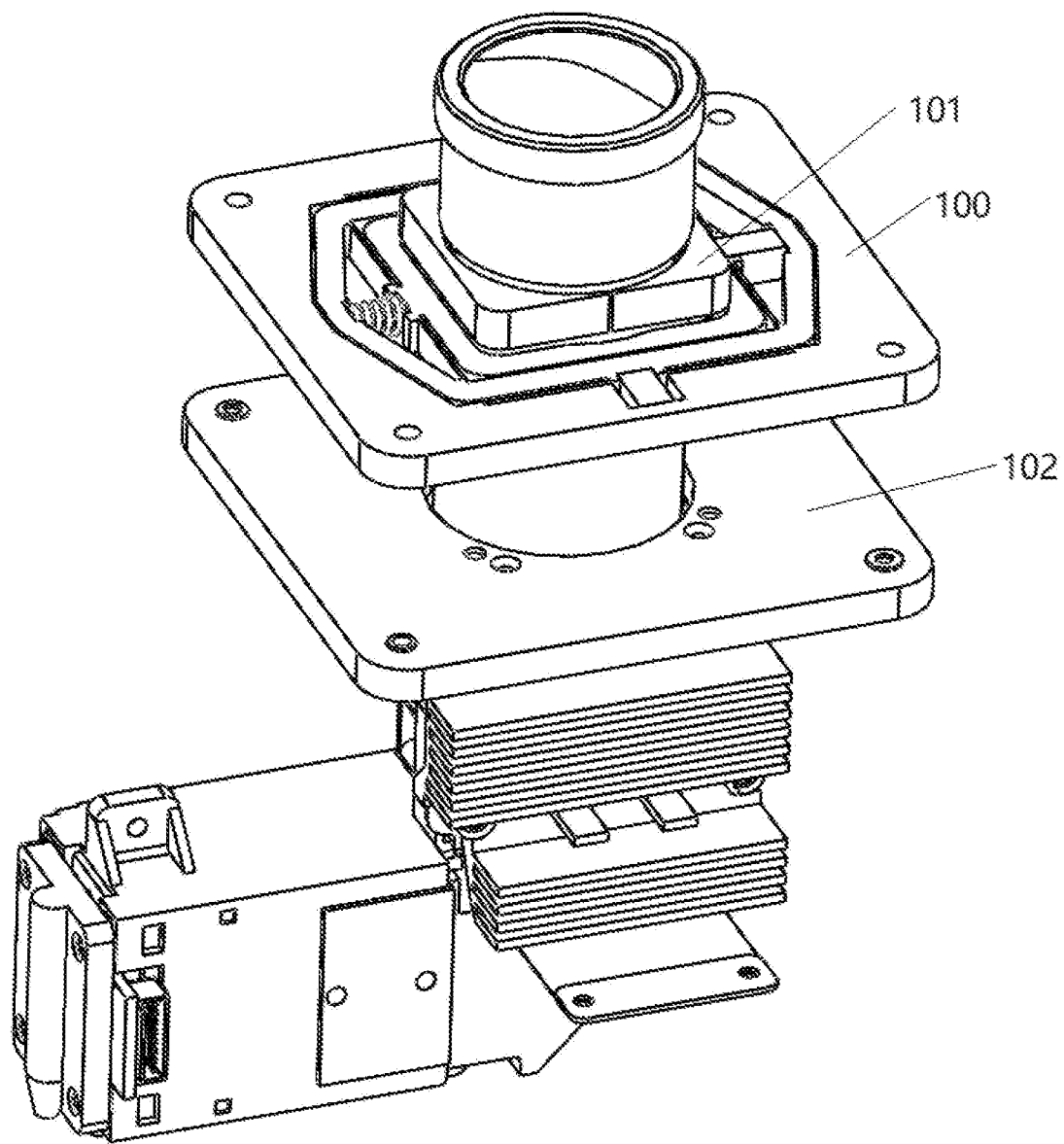
FIG. 5 is another perspective view of the fine-displacement adjusting device assembling to the light engine according to the embodiment of the present invention.

According to the preferred embodiment, FIGS. 4 and 5 show a light engine that can improve a surface finishing of a DLP printing machine, wherein the light engine comprises the above mentioned fine-displacement adjusting device 100, a lens retainer 101, a light engine retainer 102, an optical lens 108 and an optical light source 109.

The structural configuration and working principle of the fine-displacement adjusting device 100 are mentioned and disclosed in the above first and second embodiments. Accordingly, the piezoelectric ceramic of the fine-displacement adjusting device is controlled by a voltage signal in a range of 0-150V. The displacement of the piezoelectric ceramic after electrified is direct proportional to the magnitude of the voltage signal. The maximum force of the piezoelectric ceramic is 230N, and the unit of the moving displacement thereof is nanometer. The outer diameter of the spring is 8 mm, the length thereof is 10 mm, wherein other specifications are compatible with the force and the displacement of the piezoelectric ceramic.

Figure 6:
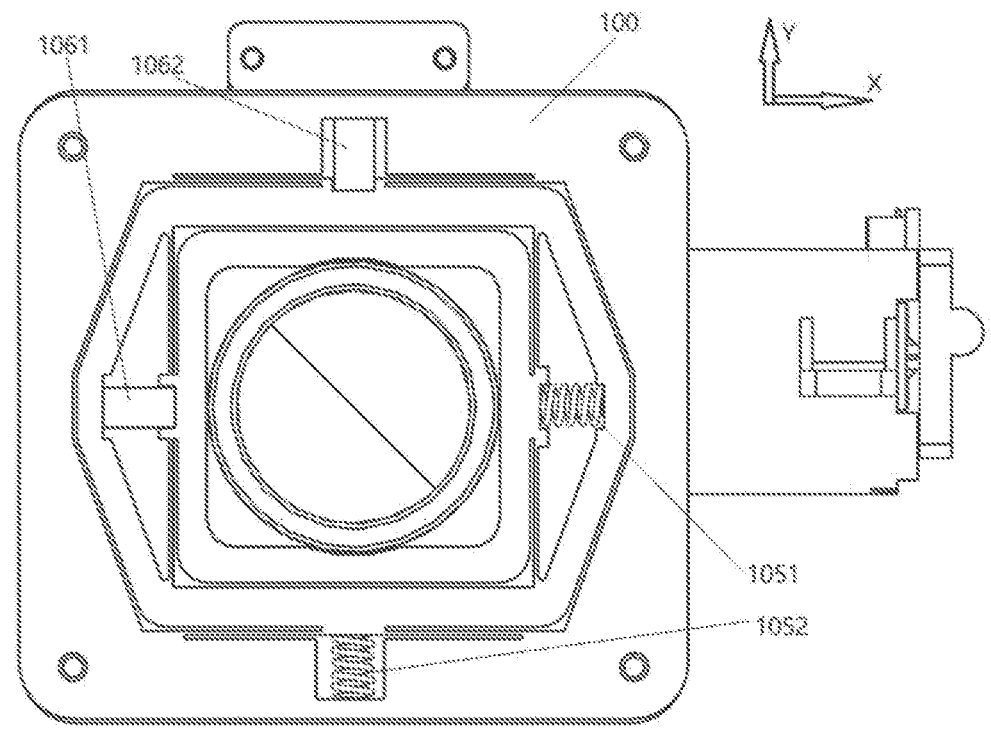
FIG. 6 is a top view of the fine-displacement adjusting device assembling to the light engine according to the embodiment of the present invention.

As shown in FIG. 6, when the optical lens is needed to move in the X direction, a predetermined voltage is applied at the first piezoelectric ceramic sheet 1061, wherein when the first piezoelectric ceramic sheet 1061 is electrified, a length of the first piezoelectric ceramic sheet 1061 is prolonged. Particularly, the length of the first piezoelectric ceramic sheet 1061 is prolonged in a nano manner. The specification parameters of the first spring 1051 located at the opposite side of the first piezoelectric ceramic sheet 1061 and are arranged to compress according to the force and the displacement of the piezoelectric ceramic sheet. Therefore, the first spring are compressed according to the force and the displacement of the piezoelectric ceramic sheet, in order to drive the optical lens to produce a slight fine-displacement in the X direction. Correspondingly, when the optical lens is needed to move in the Y direction, a predetermined voltage is applied at the second piezoelectric ceramic sheet 1062, wherein when the second piezoelectric ceramic sheet 1062 is electrified, a length of the second piezoelectric ceramic sheet 1062 is prolonged. Particularly, the length of the second piezoelectric ceramic sheet 1062 is prolonged in a nano manner. The specification parameters of the second spring 1052 located at the opposite side of the second piezoelectric ceramic sheet 1062 and are arranged to compress according to the force and the displacement of the piezoelectric ceramic sheet. Therefore, the second spring are compressed according to the force and the displacement of the piezoelectric ceramic sheet, in order to drive the optical lens to produce a slight fine-displacement in the Y direction.

The size of the hollow portion of the fine-displacement adjusting device 100 matches with the size of the lens retainer 101, so that the fine-displacement adjusting device 100 is able to fix in the lens engine by mounting the fine-displacement adjusting device 100 at the lens retainer 101 by means of interference fit. The optical lens 108 is connected to the optical light source 109 through the light engine retainer via screws to retain the first base portion of the fine-displacement adjusting device 100 with respect to the optical light source 109.

The light engine further comprises a positioning member 103, a connecting member 104, a connecting screw 105, a fine gap 106 between the light engine retainer and the connecting member 104, a protrusion platform 1021, and the optical light source 109.

Figure 7:
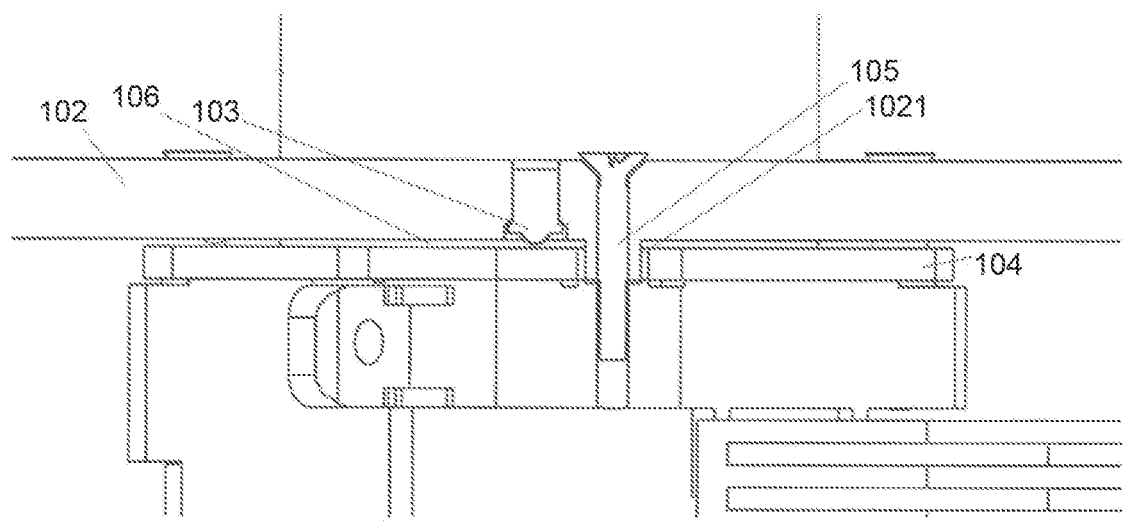
FIG. 7 is a partially sectional view of the fine-displacement adjusting device assembling to the light engine according to the embodiment of the present invention.

As shown in FIG. 7, the positioning member 103, having a bead head, is embedded in the light engine retainer 102. The protrusion platform 1021 is formed at a bottom side of the light engine retainer 102, wherein a height of the protrusion platform 1021 is greater than a thickness of the disc-shaped connecting member between the bottom of the optical lens 108 and the optical light source 109 to define a gap between the bottom of the optical lens 108 and the optical light source 109. The height of the gap is smaller than the height of the positioning member 103, so that the positioning member is interference fitted. The elasticity of the bead head of the positioning member 103 is configured to press against the optical lens 108 being tightly fixed on the optical light source 109. Therefore, the optical lens 108 will not be moved without any external force applied thereto. When the force is applied in a predetermined direction, the optical lens 108 will be moved correspondingly in the direction of the force via the second base portion and/or third base portion.

According to the preferred embodiment, when the controller of the DLP equipment is arranged to linearly amplify a control command voltage signal to a high voltage signal with a range of 0-150V, the voltage signal is transmitted to the piezoelectric ceramic of the fine-displacement adjustment device, so as to actuate the piezoelectric ceramic for prolonging the length thereof. The displacement of the piezoelectric ceramic is direct proportional to the voltage. When the two piezoelectric ceramics, which are perpendicular to each other, are electrified, the lens can be pushed to produce fine-movements in the two directions perpendicular to each other on the same plane. Therefore, the displacement of the lens can be controlled by adjusting the control voltage applied to the piezoelectric ceramics.

Through the above mentioned method of utilizing the physical displacement of the piezoelectric ceramics under a predetermined voltage, the optical lens can be moved in a two-dimensional manner with fine displacement for pushing the optical lens in a fine range so as to shift the projected image. At the first image projected on a first layer, after operating the fine-displacement adjusting device, the position of the optical lens can be fine-tuned several times to offset multiple images in coordinate positions projected on the first layer. After these images are fused and processed to improve an image accuracy, the resin layer can be solidified for printing. In other words, the surface of the printing object will have less rippling mark and will be more coherent and consistent so as to ensure the smoothness of the surface of the printing object. Therefore, through this method, the present invention is able to optimize and improve the existing low-precision light engine into a high-precision light engine at a lower cost, so as to increase the market application value.

In one embodiment, a size of an inner hollow portion of the fine-displacement adjusting device matches with the size of the optical light source that the first base portion is retained thereto, such that installing the fine-displacement adjusting device on the optical light source to electrify the piezoelectric ceramic, the optical light source is moved in two dimensions along two mutually perpendicular directions to make fine displacements, while the position of the optical lens is stationary and fixed. In fact, the present invention achieves the relative fine-displacement between the optical lens and the optical light source to pan and shift the projecting image so as to improve the surface finishing of the 3D printing object.

While the embodiments and alternatives of the invention have been shown and described, it will be apparent to one skilled in the art that various other changes and modifications can be made without departing from the spirit and scope of the invention.

What is claimed is:

1. A fine-displacement adjusting device for a light engine which comprises an optical lens and an optical light source, comprising:
    a first base portion;
    a second base portion spacedly encircled within said first base portion to define a first axis, a second axis perpendicular to said first axis and a first slit at a space between said first base portion and said second base portion;
    a first retractable element receiving cavity indented in and formed at an inner side of said first base portion;
    a first resilient element receiving cavity indented in and formed at said inner side of said first base portion to align with said first retractable element receiving cavity, wherein said first retractable element receiving cavity and said first resilient element receiving cavity are located opposite to each other and are symmetrically formed with respect to said first axis;
    a first retractable element disposed in said first retractable element receiving cavity and biased between said first base portion and said second base portion, wherein said first retractable element is configured to extend and retract its length along a direction of said first axis so as to move said second base portion in a reciprocating manner relative to said first base portion;
    a first resilient element disposed in said first resilient element receiving cavity and biased between said first base portion and said second base portion, wherein said first resilient element is arranged in such a manner that when said second base portion is moved by said first retractable element, the first resilient element is arranged to apply a first restoring force to said second base portion along the direction of said first axis so as to restore said second base portion back to its original position, so that said second base portion is fine-moved along said first axis in a reciprocating manner by said first retractable element and said first resilient element for adjusting a fine-displacement of the optical lens relative to the optical light source in the direction of said first axis; and
two first sheet-like substrate portions each integrated between said first base portion and said second base portion, wherein one of said first sheet-like substrate portion is formed between said first resilient element receiving cavity and said first slit, and another said first sheet-like substrate portion is formed between said first slit and said first retractable element receiving cavity, wherein said first sheet-like substrate portions are symmetrically formed with respect to said first axis, wherein said first retractable element and said first resilient element are disposed at said first retractable element receiving cavity and said first resilient element receiving cavity to bias against said first sheet-like substrate portions respectively.

2. The fine-displacement adjusting device of claim 1, wherein said first retractable element comprises a piezoelectric ceramic disposed in said first retractable element receiving cavity and configured to extend and retract its length in response to a voltage applied thereto.

3. The fine-displacement adjusting device of claim 1, wherein said first retractable element comprises a rod-shaped magnetostrictive member disposed in said first retractable element receiving cavity and configured to extend and retract its length in response to an alternating magnetic field signal.

4. The fine-displacement adjusting device of claim 1, wherein said first resilient element comprises a compression spring disposed in said first resilient element receiving cavity for applying a resilient force to said second base portion in the direction of said first axis.

5. The fine-displacement adjusting device of claim 1, wherein said first base portion and said second base portion are symmetrically formed with respect to said first axis.

6. The fine-displacement adjusting device of claim 1, further comprising:
a third base portion spacedly encircled within said second base portion to define a second slit at a space between said second base portion and said third base portion;
a second retractable element receiving cavity indented in and formed at an inner side of said second base portion;
a second resilient element receiving cavity indented in and formed at said inner side of said second base portion to align with said second retractable element receiving cavity, wherein said second retractable element receiving cavity and said second resilient element receiving cavity are located opposite to each other and are symmetrically formed with respect to said second axis;
a second retractable element disposed in said second retractable element receiving cavity and biased between said second base portion and said third base portion, wherein said second retractable element is configured to extend and retract its length along a direction of said second axis so as to move said third base portion in a reciprocating manner relative to said second base portion; and
a second resilient element disposed in said second resilient element receiving cavity and biased between said second base portion and said third base portion, wherein said second resilient element is arranged in such a manner that when said third base portion is moved by said second retractable element, the second resilient element is arranged to apply a second restoring force to said third base portion along the direction of said second axis so as to restore said third base portion back to its original position, so that said third base portion is fine-moved along said second axis in a reciprocating manner by said second retractable element and said second resilient element for adjusting a fine-displacement of the optical lens relative to the optical light source in the direction of said second axis.

7. The fine-displacement adjusting device of claim 6, further comprising two second sheet-like substrate portions each integrated between said second base portion and said third base portion, wherein one of said second sheet-like substrate portion is formed between said second resilient element receiving cavity and said second slit, and another said second sheet-like substrate portion is formed between said second slit and said second retractable element receiving cavity, wherein said second sheet-like substrate portions are symmetrically formed with respect to said second axis, wherein said second retractable element and said second resilient element are disposed at said second retractable element receiving cavity and said second resilient element receiving cavity to bias against said second sheet-like substrate portions respectively.

8. The fine-displacement adjusting device of claim 6, wherein said first retractable element and said second retractable element are two piezoelectric ceramics disposed in said first retractable element receiving cavity and said second retractable element receiving cavity respectively, wherein each of said piezoelectric ceramics is configured to extend and retract its length in response to a voltage applied thereto.

9. The fine-displacement adjusting device of claim 6, wherein said first retractable element and said second retractable element are two rod-shaped magnetostrictive members disposed in said first retractable element receiving cavity and said second retractable element receiving cavity respectively, wherein each of said magnetostrictive members is configured to extend and retract its length in response to an alternating magnetic field signal.

10. The fine-displacement adjusting device of claim 6, wherein said first resilient element and said second resilient element are two compression springs disposed in said first resilient element receiving cavity and said second resilient element receiving cavity respectively, wherein said first resilient element is configured for applying a resilient force to said second base portion in the direction of said first axis and said second resilient element is configured for applying a resilient force to said third base portion in the direction of said second axis.

11. The fine-displacement adjusting device of claim 6, wherein said first base portion and said second base portion are symmetrically formed with respect to said first axis, wherein said second base portion and said third base portion are symmetrically formed with respect to said second axis, wherein each of said second base portion and said third base portion is moved in a nanoscale manner.

12. A method of adjusting a fine-displacement of an optical lens relative to an optical light source of a light engine, comprising the steps of:
(a) installing a fine-displacement adjusting device into the light engine, wherein said fine-displacement adjusting device is constructed to have a first base portion, a second base portion spacedly encircled within said first base portion to define a first axis, a second axis perpendicular to said first axis and a first slit at a space between said first base portion and said second base portion, a first retractable element receiving cavity indented in and formed at an inner side of said first base portion, and a first resilient element receiving cavity indented in and formed at said inner side of said first base portion to align with said first retractable element receiving cavity, wherein said first retractable element receiving cavity and said first resilient element receiving cavity are located opposite to each other and are symmetrically formed with respect to said first axis;

(b) applying a first force to said second base portion by a first retractable element which is disposed in said first retractable element receiving cavity and biased between said first base portion and said second base portion, wherein said first retractable element is configured to extend and retract its length along a direction of said first axis in order to apply said first force to move said second base portion in a reciprocating manner relative to said first base portion;

(c) applying a first resilient force to said second base portion by a first resilient element which disposed in said first resilient element receiving cavity and biased between said first base portion and said second base portion, wherein said first resilient element is arranged in such a manner that when said second base portion is moved by said first retractable element, the first resilient element is arranged to apply said first resilient force to said second base portion along the direction of said first axis so as to restore said second base portion back to its original position, so that said second base portion is fine-moved along said first axis in a reciprocating manner by said first retractable element and said first resilient element for adjusting the fine-displacement of the optical lens relative to the optical light source in the direction of said first axis;

(d) spacedly encircling a third base portion said second base portion to define a second slit at a space between said second base portion and said third base portion, wherein said fine-displacement adjusting device is further constructed to have a second retractable element receiving cavity indented in and formed at an inner side of said second base portion, and a second resilient element receiving cavity indented in and formed at said inner side of said second base portion to align with said second retractable element receiving cavity, wherein said second retractable element receiving cavity and said second resilient element receiving cavity are located opposite to each other and are symmetrically formed with respect to said second axis;

(e) applying a second force to said third base portion by a second retractable element which is disposed in said second retractable element receiving cavity and biased between said second base portion and said third base portion, wherein said second retractable element is configured to extend and retract its length along a direction of said second axis in order to apply said second force to move said third base portion in a reciprocating manner relative to said third base portion; and (f) applying a second resilient force to said third base portion by a second resilient element which disposed in said second resilient element receiving cavity and biased between said second base portion and said third base portion, wherein said second resilient element is arranged in such a manner that when said third base portion is moved by said second retractable element, the second resilient element is arranged to apply said second resilient force to said third base portion along the direction of said second axis so as to restore said third base portion back to its original position, so that said third base portion is fine-moved along said second axis in a reciprocating manner by said second retractable element and said second resilient element for adjusting the fine-displacement of the optical lens relative to the optical light source in the direction of said second axis.

13. The method of claim 12, wherein a direction of said first force from said first retractable element is opposite to a direction of said first resilient force from said first resilient element along said first axis, wherein a direction of said second force from said second retractable element is opposite to a direction of said second resilient force from said second resilient element along said second axis.

14. The method of claim 12, wherein the steps (b) further comprises a step of applying a first voltage to said first retractable element to selectively control the length thereof in a direction of said first axis, wherein the steps (e) further comprises a step of applying a second voltage to said second retractable element to selectively control the length thereof in a direction of said second axis, wherein said first retractable element and said second retractable element are two piezoelectric ceramics disposed in said first retractable element receiving cavity and said second retractable element receiving cavity respectively, wherein each of said piezoelectric ceramics is configured to extend and retract its length in response to said voltages applied thereto.

15. The method of claim 12, wherein the step (b) further comprises a step of applying a first alternating magnetic field signal to said first retractable element to selectively control the length thereof in a direction of said first axis, wherein the step (e) further comprises a step of applying a second alternating magnetic field signal to said second retractable element to selectively control the length thereof in a direction of said second axis, wherein said first retractable element and said second retractable element are two rod-shaped magnetostrictive members disposed in said first retractable element receiving cavity and said second retractable element receiving cavity respectively, wherein each of said magnetostrictive members is configured to extend and retract its length in response to an alternating magnetic field signal.

16. The method of claim 12, wherein said first resilient element and said second resilient element are two compression springs disposed in said first resilient element receiving cavity and said second resilient element receiving cavity respectively, wherein said first resilient element is configured for applying a resilient force to said second base portion in the direction of said first axis and said second resilient element is configured for applying a resilient force to said third base portion in the direction of said second axis.

17. The method of claim 12, further comprising the steps of:

(g) forming two first sheet-like substrate portions each integrated between said first base portion and said second base portion, wherein one of said first sheet-like substrate portion is formed between said first resilient element receiving cavity and said first slit, and another said first sheet-like substrate portion is formed between said first slit and said first retractable element receiving cavity, wherein said first sheet-like substrate portions are symmetrically formed with respect to said first axis, wherein said first retractable element and said first resilient element are disposed at said first retractable element receiving cavity and said first resilient element receiving cavity to bias against said first sheet-like substrate portions respectively; and (h) forming two second sheet-like substrate portions each integrated between said second base portion and said third base portion, wherein one of said second sheet-like substrate portion is formed between said second resilient element receiving cavity and said second slit, and another said second sheet-like substrate portion is formed between said second slit and said second retractable element receiving cavity, wherein said second sheet-like substrate portions are symmetrically formed with respect to said second axis, wherein said second retractable element and said second resilient element are disposed at said second retractable element receiving cavity and said second resilient element receiving cavity to bias against said second sheet-like substrate portions respectively.

18. The method of claim 12, wherein said first base portion and said second base portion are symmetrically formed with respect to said first axis, wherein said second base portion and said third base portion are symmetrically formed with respect to said second axis, wherein each of said second base portion and said third base portion is moved in a nanoscale manner.

19. A method of adjusting a fine-displacement of an optical lens relative to an optical light source of a light engine, comprising the steps of:

(a) installing a fine-displacement adjusting device into the light engine, wherein said fine-displacement adjusting device is constructed to have a first base portion, a second base portion spacedly encircled within said first base portion to define a first axis, a second axis perpendicular to said first axis and a first slit at a space between said first base portion and said second base portion, a first retractable element receiving cavity indented in and formed at an inner side of said first base portion, and a first resilient element receiving cavity indented in and formed at said inner side of said first base portion to align with said first retractable element receiving cavity, wherein said first retractable element receiving cavity and said first resilient element receiving cavity are located opposite to each other and are symmetrically formed with respect to said first axis;

(b) applying a first force to said second base portion by a first retractable element which is disposed in said first retractable element receiving cavity and biased between said first base portion and said second base portion, wherein said first retractable element is configured to extend and retract its length along a direction of said first axis in order to apply said first force to move said second base portion in a reciprocating manner relative to said first base portion;

(c) applying a first resilient force to said second base portion by a first resilient element which disposed in said first resilient element receiving cavity and biased between said first base portion and said second base portion, wherein said first resilient element is arranged in such a manner that when said second base portion is moved by said first retractable element, the first resilient element is arranged to apply said first resilient force to said second base portion along the direction of said first axis so as to restore said second base portion back to its original position, so that said second base portion is fine-moved along said first axis in a reciprocating manner by said first retractable element and said first resilient element for adjusting the fine-displacement of the optical lens relative to the optical light source in the direction of said first axis;

(d) spacedly encircling a third base portion within said second base portion to define a second slit at a space between said second base portion and said third base portion, wherein said fine-displacement adjusting device is further constructed to have a second retractable element receiving cavity indented in and formed at an inner side of said second base portion, and a second resilient element receiving cavity indented in and formed at said inner side of said second base portion to align with said second retractable element receiving cavity, wherein said second retractable element receiving cavity and said second resilient element receiving cavity are located opposite to each other and are symmetrically formed with respect to said second axis;

(e) applying a second force to said third base portion by a second retractable element which is disposed in said second retractable element receiving cavity and biased between said second base portion and said third base portion, wherein said second retractable element is configured to extend and retract its length along a direction of said second axis in order to apply said second force to move said third base portion in a reciprocating manner relative to said third base portion; and (f) applying a second resilient force to said third base portion by a second resilient element which disposed in said second resilient element receiving cavity and biased between said second base portion and said third base portion, wherein said second resilient element is arranged in such a manner that when said third base portion is moved by said second retractable element, the second resilient element is arranged to apply said second resilient force to said third base portion along the direction of said second axis so as to restore said third base portion back to its original position, so that said third base portion is fine-moved along said second axis in a reciprocating manner by said second retractable element and said second resilient element for adjusting the fine-displacement of the optical lens relative to the optical light source in the direction of said second axis.

20. The light engine of claim 19, wherein said two first elastic elements are a first retractable element and a first resilient element respectively, wherein said first retractable element is configured to extend and retract its length along a direction of said first axis so as to move said second base portion in a reciprocating manner relative to said first base portion, wherein said first resilient element is arranged in such a manner that when said second base portion is moved by said first retractable element, the first resilient element is arranged to apply a first restoring force to said second base portion along the direction of said first axis so as to restore said second base portion back to its original position.

21. The light engine of claim 20, wherein said first retractable element is selected from a group consisting of a piezoelectric ceramic configured to extend and retract its length in response to a voltage applied thereto and a rod-shaped magnetostrictive member configured to extend and retract its length in response to an alternating magnetic field signal, wherein said first resilient element comprises a compression spring configured for applying a resilient force to said second base portion in the direction of said first axis.

22. The light engine of claim 21, wherein said two second elastic elements are a second retractable element and a second resilient element respectively, wherein said second retractable element is configured to extend and retract its length along a direction of said second axis so as to move said third base portion in a reciprocating manner relative to said second base portion, wherein said second resilient element is arranged in such a manner that when said third base portion is moved by said second retractable element, the second resilient element is arranged to apply a second restoring force to said third base portion along the direction of said second axis so as to restore said third base portion back to its original position.

23. The light engine of claim 22, wherein said second retractable element is selected from a group consisting of a piezoelectric ceramic configured to extend and retract its length in response to a voltage applied thereto and a rod-shaped magnetostrictive member configured to extend and retract its length in response to an alternating magnetic field signal, wherein said second resilient element comprises a compression spring configured for applying a resilient force to said third base portion in the direction of said second axis.

24. The light engine of claim 23, wherein said first base portion and said second base portion are symmetrically formed with respect to said first axis, wherein said second base portion and said third base portion are symmetrically formed with respect to said second axis, wherein each of said second base portion and said third base portion is moved in a nanoscale manner.

* * * * *